United States Patent [19]
Tabaczynski

[11] 3,903,848
[45] Sept. 9, 1975

[54] TWO-STAGE ROTARY COMBUSTION ENGINE

[75] Inventor: Rodney J. Tabaczynski, Birmingham, Mich.

[73] Assignee: General Motors Corporation, Detroit, Mich.

[22] Filed: Aug. 14, 1974

[21] Appl. No.: 497,331

[52] U.S. Cl. .............................. 123/8.13; 123/8.07
[51] Int. Cl.² ......................................... F02B 53/04
[58] Field of Search ........................ 123/8.07, 8.13

[56] References Cited
UNITED STATES PATENTS
3,785,352  1/1974  Date et al. .......................... 123/8.13
3,805,746  4/1974  Ishii et al. .......................... 123/8.13

*Primary Examiner*—C. J. Husar
*Assistant Examiner*—Michael Koczo, Jr.
*Attorney, Agent, or Firm*—Ronald L. Phillips

[57] ABSTRACT

A rotary combustion engine arrangement having a first stage rotary engine section in which a rich air-fuel mixture is spark ignited with the hot combustion gases thereof directed to provide jet ignition for a second stage rotary engine section that inducts fresh air and the rich exhaust products from the prechamber section.

3 Claims, 6 Drawing Figures

TWO-STAGE ROTARY COMBUSTION ENGINE

This invention relates to a two-stage rotary combustion engine and more particularly to a rotary engine arrangement having a first stage spark ignited rich air-fuel rotary engine section that provides jet ignition for a second stage rotary engine section.

In rotary combustion engines as in reciprocating piston combustion engines, the fuel charge may be stratified or burned in two stages in an effort to meet emission standards with maximum fuel economy. Of the various charge arrangements that have been proposed for use in rotary engines of the presently commercial type, it is believed that a two-stage rotary combustion engine arrangement presents a substantial amount of promise in meeting the designated task.

According to the present invention there is provided a two-stage rotary combustion engine for reducing undesirable emissions while maximizing fuel economy comprising first and second stage sections, each having a rotor with a plurality of chambers thereabout that expand and contract while moving with the rotor as the rotor rotates. A rich air-fuel mixture is supplied to the chambers in the first stage and after compression this rich charge is spark ignited with the resulting hot combustion gases then directed by a gas transfer port into the chambers in the second stage. The chambers in the second stage induct both the rich products from the exhaust of the first stage chambers and fresh air and this mixture is ignited by the jet of hot combustion gases from the first stage chambers with the products from the second stage combustion being what is finally exhausted from the engine. This engine arrangement thus provides many advantages. For example, the first stage chambers are scavenged, neither of the stages have valves, and the first stage section also produces power to increase the overall efficiency of the engine. Furthermore, the fresh air added to the exhaust from the first stage chambers which is rich in hydrocarbons and carbon monoxide allows for the complete combustion of these products in the second stage chambers. Thus, this system produces low nitric oxides from the rich combustion in the first stage and the relatively cool second stage combustion and produces low hydrocarbons and carbon monoxide because of the efficient fuel utilization.

An object of the present invention is to provide a new and improved two-stage rotary combustion engine.

Another object is to provide in a carbureted prechamber rotary combustion engine a first stage rotary engine section in which a rich air-fuel mixture is spark ignited and the hot combustion gases that result are directed to ignite a mixture in a second stage rotary engine section comprising fresh air and the exhaust from the first stage section.

Another object is to provide a two-stage rotary combustion engine having phased first and second stage chambers in different rotary engine sections that simultaneously expand and contract wherein a rich air-fuel mixture is spark ignited in the first stage chambers and delivered by a single gas transfer port to ignite a mixture in the second stage chambers comprising fresh air and the exhaust from the first stage chambers.

These and other objects of the present invention will be more apparent from the following description and drawing in which.

Figure 1:
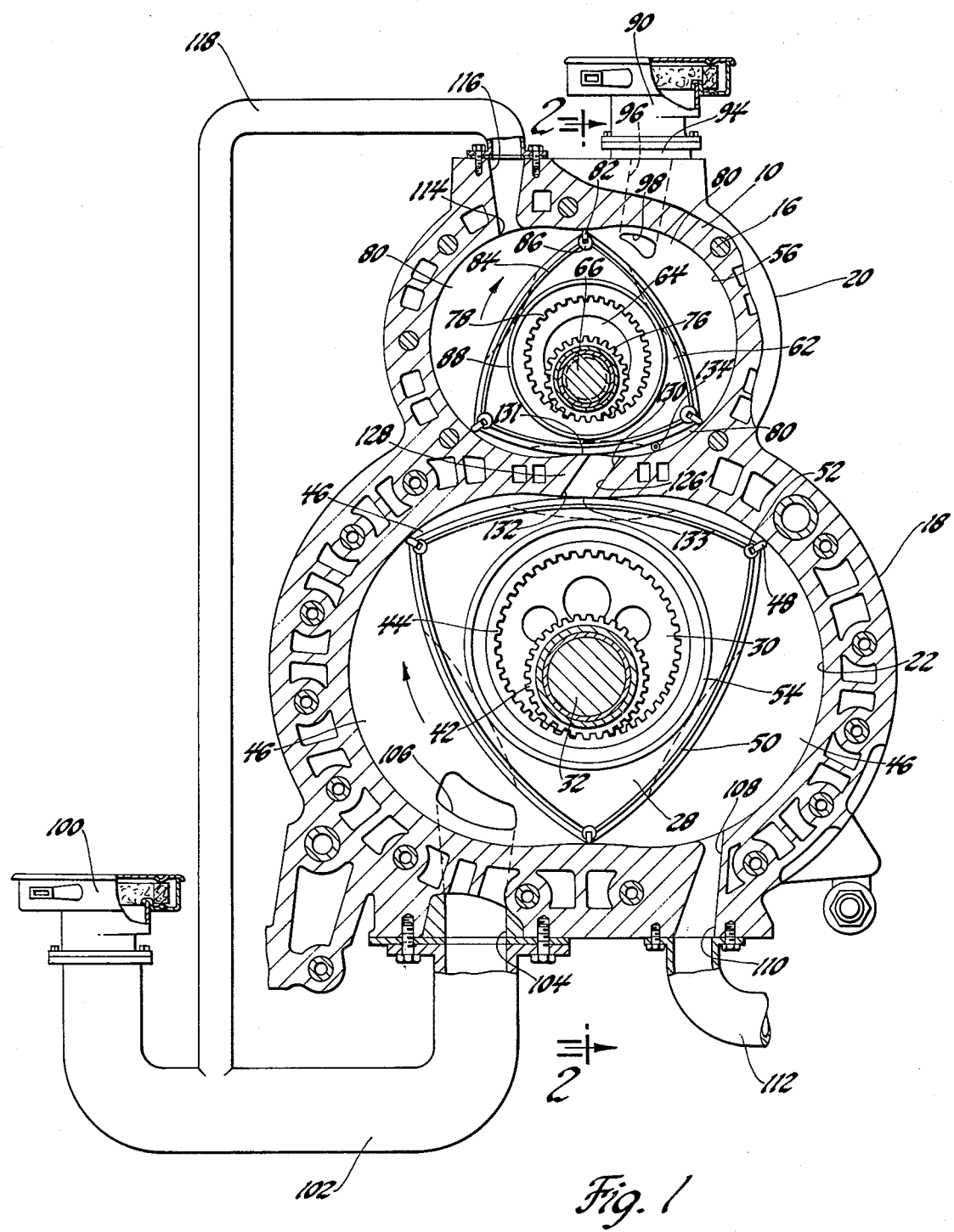
FIG. 1 is a front elevational view with parts in section of a carbureted prechamber rotary combustion engine according to the present invention.
Figure 2:
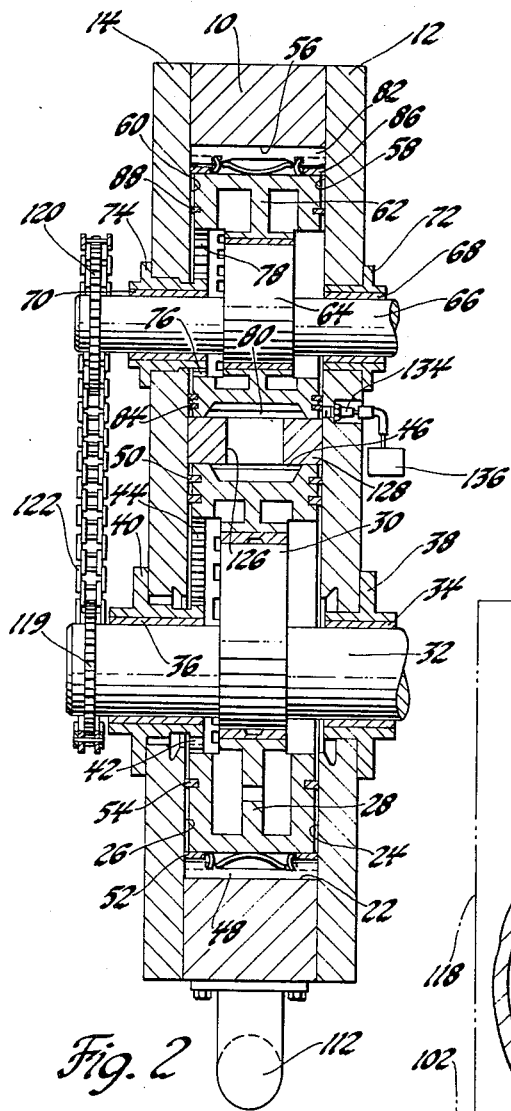
FIG. 2 is a view taken along the line 2—2 in FIG. 1.

As shown in FIGS. 1 and 2, the rotary engine according to the present invention comprises a stationary body having a rotor housing 10 clamped between a pair of end housings 12 and 14 by a plurality of bolts 16 that are circumferentially spaced about the housings. The housings cooperatively provide the main stationary structure of a second stage rotary engine section 18 and also a first stage rotary engine section 20. In the first stage rotary engine section, the rotor housing 10 has an inwardly facing peripheral wall 22 and the end housings 12 and 14 have oppositely facing internal end walls 24 and 26 which cooperatively provide a cavity in which a second stage rotor 28 is located. The rotor 28 is rotatably mounted on an eccentric 30 of a crankshaft 32 which is mounted on opposite sides of the eccentrics in sleeve bearings 34 and 36. The sleeve bearings 34 and 36 are held in collars 38 and 40 that are bolted to the respective end housings 12 and 14. The collar 40 on its inboard end has a phasing gear 42 formed thereon which meshes with an internal tooth rotary phasing gear 44 formed on one side of the rotor 28 concentric with the rotor's hub. The rotary phasing gear 44 has one and one-half times the number of teeth as the stationary phasing gear 42 and the inner peripheral wall 22 is a two-lobe epitrochoid or a curve parallel thereto and the rotor 28 has three lobes which face this peripheral wall to provide three second stage chambers 46 which are spaced about and move with the rotor while expanding and contracting in a fixed phase relationship to the engine housing twice during each rotor revolution while the rotor revolves once for every three revolutions of the second stage crankshaft 32.

The chambers 46 are sealed by apex seals 48, side seals 50 and corner seals 52. Each of the apex seals 48 is mounted on the rotor at each rotor apex and extends the width thereof and is biased to sealingly contact the peripheral wall 22 while the side seals 50 are mounted on the sides of the rotor and extend between the rotor apexes and are biased to sealingly contact the oppositely facing end wall. The corner seals 52 are each mounted in a rotor side near an apex and are biased to engage the oppositely facing end wall and provide a sealing link between adjacent ends of the side seals and one end of the adjacent apex seal. In addition, there is provided an oil seal 54 mounted in each rotor side that is biased to sealingly engage the oppositely facing end wall to prevent oil used for lubrication from reaching radially outward to the working chambers.

Similarly, in the first stage rotary engine section 20, the rotor housing 10 has an inner peripheral wall 56 and the end housings 12 and 14 have oppositely facing inner end walls 58 and 60 which cooperate to define a cavity in which a first stage rotor 62 is located. The rotor 62 is rotatably mounted on an eccentric 64 of a crankshaft 66 which in turn is rotatably mounted on opposite sides of the eccentric in sleeve bearings 68 and 70 that are held in collars 72 and 74 which are bolted to the respective end housings 12 and 14. A stationary phasing gear 76 formed on the inboard end of collar 74 meshes with an internal tooth rotary phasing gear 78 formed on one side of rotor 62. The gear ratio of the first stage phasing gears 76 and 78 is the same as that of the second stage phasing gears 42 and 44 while the first stage peripheral wall 56 and flanks of prechamber rotor 62 have similar shapes but smaller dimensions than the corresponding second stage peripheral wall 22 and flanks of main chamber rotor 28 to provide three first stage chambers 80 smaller than the second stage chambers 46 which are spaced about and move with the rotor 62 while expanding and contracting as this rotor is forced to rotate at one-third the speed of the crankshaft 62 in fixed phase relation to the stationary engine body. For the two-stage combustion with jet ignition contemplated, the first stage chambers are sized to be greater than about 20 percent of the second stage chamber size. Also like on the second stage rotor 28, there are provided apex seals 82, side seals 84, corner seals 86, and oil seals 88 on the first stage rotor 62 to provide sealing for the first stage chambers 80.

Describing now the induction system of the engine, there is provided a first stage carburetor 90 which is controlled through linkage, not shown, by the operator and delivers a rich air-fuel mixture to the first stage rotary engine section 20. The rich mixture first stage carburetor 90 is mounted on an intake manifold 94 which is bolted to the engine housing. The intake manifold 94 communicates with a pair of intake passages 96 in the end housings 12 and 14 that terminate with oppositely facing side intake ports 98 in the end walls 58 and 60, only one intake passage and intake port being shown. The intake ports 98 are located so as to be opened past the rotor sides to the small first stage chambers 80 as they are expanding in an intake phase and then be closed to these chambers by the rotor sides as they are contracting during a compression phase as rotor 62 rotates in the direction indicated by the arrow in FIG. 1. In contrast, in the second stage rotary engine section 18, a fresh air intake and cleaner arrangement 100 is mounted on an intake manifold 102 which is bolted to the engine housing and communicates with a pair of intake passages 104 in the end housings 12 and 14 that terminate with oppositely facing side intake ports 106 in the end walls 24 and 26, only one such intake passage and intake port being shown. The intake ports 106 are located so that they are open past the rotor sides to the second stage chambers 46 as they are expanding in an intake phase and are then closed to these chambers by the rotor sides as they are contracting in a compression phase as the second stage rotor 28 rotates in the direction indicated by the arrow in FIG. 1 which is the same turning direction as the first stage rotor 62.

The second stage rotary engine section 18 has an exhaust port 108 in the peripheral wall 22 which is opened by passage of the apex seals 48 to connect the trailing main chambers during an exhaust phase to an exhaust passage 110 in the rotor housing which communicates with an exhaust pipe 112 that is bolted to the engine housing and is open to atmosphere. In the first stage rotary engine section 20 there is provided an exhaust port 114 in the peripheral wall 56 that is opened by the passing apex seals 82 to connect the trailing first stage chamber 80 to a passage 116 in the rotor housing which communicates with a gas transfer pipe 118 that is bolted at this end to the rotor housing but does not communicate with atmosphere.

The two-stage sections 18 and 20 have thus far been described as to their separate details. Describing now their cooperative association, there is provided a fixed phase relationship between the two rotary engine sections by sprockets 119 and 120 which are secured to one end of the respective crankshafts 32 and 66 and engage a chain 122 as shown in FIG. 2. The sprockets 119 and 120 have the same pitch diameter and the crankshafts are indexed relative to each other to phase the two rotors 28 and 62 so that the second stage chambers 46 and first stage chambers 80 are phased in pairs that simultaneously expand and contract in the intake, compression, expansion and exhaust phases of their cycle at the same time as the two rotors rotate in opposite directions. In addition, there is provided a jet ignition port 126 through the partition 128 in the rotor housing 10 that separates the two peripheral walls 22 and 56. The jet ignition port 126 has an opening 130 on the leading side of the cusp 131 in the first stage peripheral wall 56 and another opening 132 on the leading side of the cusp 133 in the second stage chamber peripheral wall 22 which are located opposite the respective intake and exhaust porting in these engine sections and relative to each other so that each first stage chamber 80 is connected by the jet ignition port 126 to the second stage chamber 56 with which it is in phase commencing near the end of their compression phases and extending into and concluding during their expansion or power phases of the engine cycle as will be described in more detail later. Furthermore, the gas transfer pipe 118 from the first stage exhaust port 114 is connected to the intake manifold 102 to the second stage intake ports 106 so that the second stage chambers 46 induct a mixture of fresh air and all of the exhaust from the first stage chambers 80. In addition, there is provided a spark plug 134 which is mounted in the first stage rotary engine section 20 in the end housing 12 with its electrodes located in a hole in the end wall 58 so as to be exposed to the first stage chambers 80 just upstream of the opening 130 to the jet ignition port 126. The spark plug 134 is fired at the proper time by an ignition circuit 136 of any suitable conventional type as will be described in more detail later.

Figure 4:
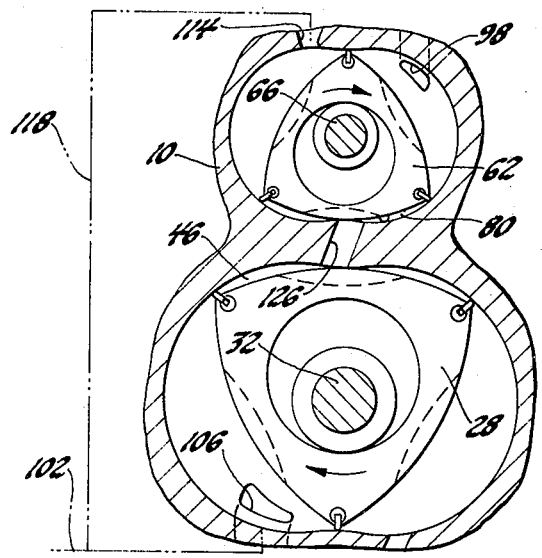
FIGS. 3 – 6 illustrate different operating phases of the engine.
Figure 5:
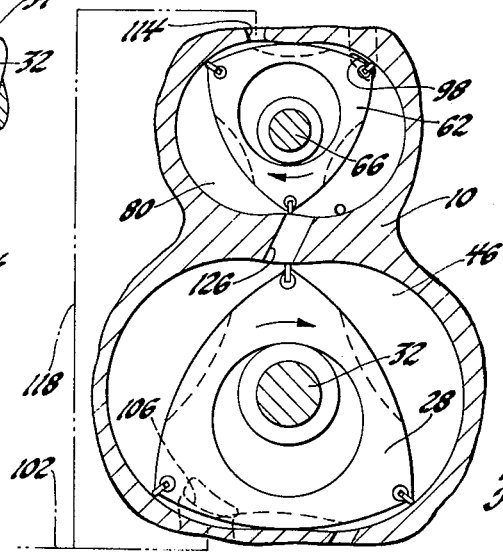
Figure 3:
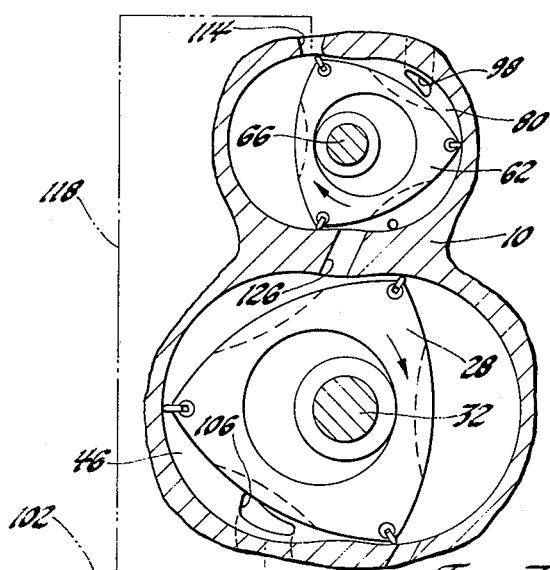
Figure 6:
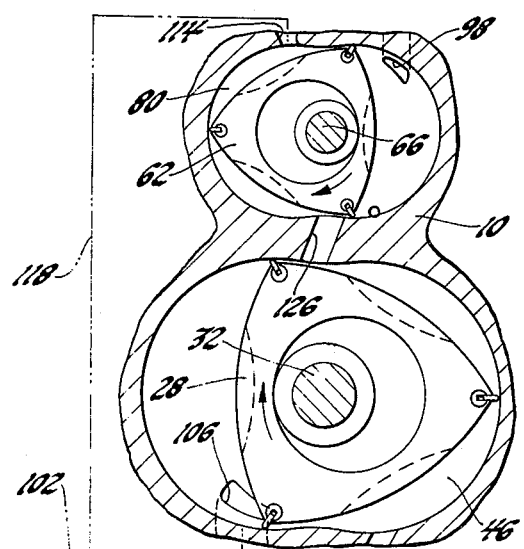

Describing now a typical operation of the two-stage rotary combustion engine structure described above, reference will be made to FIGS. 3, 4, 5 and 6, wherein the engine is shown shcematically during different phases of its operation. First considering the induction or intake process with reference to FIG. 3, a carbureted rich air-fuel mixture from the carburetor 90 is inducted into the singularly designated small first stage chamber 80 through the intake ports 98 while the exhaust products from a leading first stage chamber which are rich in hydrocarbons and carbon monoxide are transferred by pipe 118 to be mixed with fresh air from the air intake 100 and then inducted into the singularly designated large second stage chamber 46 through the intake ports 106. The rotors 28 and 62 rotate in the same direction and the charges in the second stage chamber 46 and first stage chamber 80 which are in phase with each other are then compressed to the point of ignition shown in FIG. 4. When both chambers are near their minimum volumes, the spark plug 134 is fired so that ignition originates in the first stage chamber 80. Because the first stage mixture is rich, the combustion is regular and the flame speed is fast causing a much higher pressure in the first stage chamber 80 than in the second stage chamber 46. This pressure differential forces the flow of hot burned gases through the jet ignition port 126 into the large second stage chamber 46 where most of the mixture of fresh air and exhaust products from the first stage has passed by the opening 132 after the combustion in the small first stage chamber 80. These hot combustion gases then serve as a high intensity jet ignition source that causes the mixture in the second stage chamber 46 to undergo reliable, complete combustion. FIG. 5 shows the expansion or power phase wherein both the second stage chamber 46 with the fresh air and first stage exhaust products and the first stage chamber 80 with the rich mixture undergo expansion with the combustion occurring therein producing power to drive their respective crankshafts 32 and 66. Following the expansion phase, final exhaust from the engine is from the second stage chamber 46 through exhaust port 108 to atmosphere as shown in FIG. 6.

Thus, it is seen that there is provided a two-stage rotary combustion engine wherein the first stage chambers are scavenged, neither of the stages have valves and the first stage also produces power. Furthermore, all the exhaust from the rich burning first stage which is rich in hydrocarbons and carbon monoxide is delivered to the second stage with fresh air being added along the way to allow for complete combustion in the second stage by the jet ignition from the first stage. As a result, this system produces low nitric oxides because of the rich combustion in the first stage and the relatively cool combustion in the second stage and produces low hydrocarbons and carbon monoxide because of the efficient fuel utilization with the jet ignition from the first stage providing positive sustained ignition in the second stage with its harder to combust mixture.

The above described embodiment is illustrative of the invention which may be modified within the scope of the appended claims.

I claim:

1. A two-stage rotary combustion engine comprising a first stage section and a second stage section, each said section having a rotatably supported rotor with a plurality of chambers thereabout that expand and contract while moving with said rotor as said rotor rotates, each said section also having an intake port that opens to the chambers in this section as they expand during an intake phase, each said section also having an exhaust port that opens to the chambers in this section as they contract during an exhaust phase, the chambers in said first stage section being substantially smaller than the chambers in said second stage section, means drivingly connecting said rotors so that the chambers in said sections are phased in pairs that simultaneously expand and contract, a jet ignition port that connects the phased pairs of the chambers in said sections only as they contract and then expand in a compression phase and a power phase respectively, rich air-fuel supply means for supplying a rich air-fuel mixture to the intake port of said first stage section, fresh air supply means for supplying fresh air to the intake port of said second stage section, gas transfer passage means for delivering all the products of combustion exhausted from the exhaust port of said first stage section to mix with the fresh air supplied to the intake port of said second stage section, and spark ignition means for first igniting the rich air-fuel mixture in the chambers in said first stage section whereby ignition originates in the chambers in said first stage section and there is effected a pressure differential causing hot combustion gases in the chambers in said first stage section to flow through said jet ignition port and ignite the mixture of fresh air and the exhausted products of combustion from said first stage section in the associated chambers in said second stage section.

2. A two-stage rotary combustion engine comprising a first stage section and a second stage section, each said section having a multi-lobe internal peripheral wall and a rotatably supported multi-lobe rotor with a plurality of chambers thereabout that expand and contract while moving with said rotor as said rotor rotates, each said section also having an intake port that opens to the chambers in this section as they expand during an intake phase, each said section also having an exhaust port that opens to the chambers in this section as they contract during an exhaust phase, the chambers in said first stage section being substantially smaller in volume than the chambers in said second stage section, means drivingly connecting said rotors so that the chambers in said sections are phased in pairs that simultaneously expand and contract, a jet ignition port that connects the phased pairs of the chambers in said sections only as they contract and then expand in a compression phase and a power phase respectively, rich air-fuel supply means for supplying a rich air-fuel mixture to the intake port of said first stage section, fresh air supply means for supplying fresh air to the intake port of said second stage section, gas transfer passage means connecting the exhaust port of said first stage section to said fresh air supply means so that a mixture of fresh air and all the products of combustion from the exhaust port of said first stage section is delivered to the intake port of said second stage section, and spark ignition means for first igniting the rich air-fuel mixture in the chambers in said first stage section whereby ignition originates in the chambers in said first stage section and there is effected a pressure differential causing hot combustion gases in the chambers in said first stage section to flow through said jet ignition port and ignite the fresh air and first stage exhaust products mixture in the associated chambers in said second stage section.

3. A two-stage rotary combustion engine comprising a main chamber section and a prechamber section, each said section having a two-lobe internal peripheral wall, each said section also having a rotatably supported crankshaft with an eccentric, each said section also having a rotor rotatably mounted on said eccentric and cooperating with the associated peripheral wall to provide three chambers about the rotor that expand and contract while moving with said rotor as said rotor rotates, each said section also having a stationary phasing gear meshing with a rotary phasing gear on the rotor in this section so that the rotor rotates at one-third the speed of the crankshaft in this section and in fixed relationship to the peripheral wall in this section, each said section also having an intake port that opens to the chambers in this section as they expand during an intake phase, each said section also having an exhaust port that opens to the chambers in this section as they contract during an exhaust phase, the chambers in said first stage section being substantially smaller in volume than the chambers in said second stage section, means drivingly connecting said crankshafts with a one-to-one speed ratio so that the chambers in said sections are phased in pairs that simultaneously expand and contract, a jet ignition port that connects the phased pairs of the chambers in said sections only as they contract and then expand in a compression phase and a power phase respectively, rich air-fuel supply means for supplying a rich air-fuel mixture to the intake port of said first stage section, fresh air supply means for supplying fresh air to the intake port of said second stage section, gas transfer passage means connecting the exhaust port of said first stage section to said fresh air supply means so that a mixture of fresh air and all the products of combustion from the exhaust port of said first stage section is delivered to the intake port of said second stage section, and spark ignition means for first igniting the rich air-fuel mixture in the chambers in said first stage section whereby ignition originates in the chambers in said first stage section and there is effected a pressure differential causing hot combustion gases in the chambers in said first stage section to flow through said jet ignition port and ignite the mixture of fresh air and first stage exhaust products in the associated chambers in said second chamber section.

* * * * *